United States Patent
Bigo

(10) Patent No.: US 6,323,979 B1
(45) Date of Patent: Nov. 27, 2001

(54) REGENERATOR WITH OPTICAL MODULATION FOR OPTICAL FIBER TRANSMISSION SYSTEMS USING SOLITON SIGNALS

(75) Inventor: Sébastien Bigo, Palaiseau (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/044,182

(22) Filed: Mar. 19, 1998

(30) Foreign Application Priority Data

Mar. 20, 1997 (FR) ................................. 97 03415

(51) Int. Cl.⁷ .................................. H04B 10/00
(52) U.S. Cl. .......................... 359/158; 359/176
(58) Field of Search .................. 359/158, 161, 359/173, 179; 385/15, 16

(56) References Cited

U.S. PATENT DOCUMENTS

| | | | |
|---|---|---|---|
| 5,309,267 | * 5/1994 | Huang | 359/139 |
| 5,548,433 | * 8/1996 | Smith | 359/158 |
| 5,737,110 | * 4/1998 | Suzuki et al. | 359/161 |
| 5,757,529 | * 5/1998 | Desurvire et al. | 359/179 |
| 5,812,567 | * 9/1998 | Jeon et al. | 372/6 |
| 5,831,752 | * 11/1998 | Cotter et al. | 359/135 |
| 5,857,040 | * 1/1999 | Bigo et al. | 385/15 |
| 5,926,492 | * 7/1999 | Yoshida et al. | 372/6 |

FOREIGN PATENT DOCUMENTS

0718992A1   6/1996   (EP) .

OTHER PUBLICATIONS

M. Nakazawa et al, "Nolm Oscillator and Its Injection Locking Technique for Timing Clock Extraction and Demultiplexing", Electronics Letters, vol. 32, No. 12, Jun. 6, 1996, p. 1122/1123.

Jinno, Masahiko, "All Optical Signal Regularizing/Regeneration Using a Nonlinear Fiber Sagnac Interferometer Switch with Signal–Clock Walk–Off", IEEE Journal of Lightwave Technology, vol. 12, No. 9, Sep. 1994.*

Bigo et al., "20 GHz all–optical clock recovery based on fibre laser mode–locking with fibre nonlinear loop mirror as variable intensity/phase modulator", IEEE Electronic Letters, vol. 31 No. 21, Oct. 12, 1995.*

Brun–Maunand, "Regenerated Transoceanic soliton System: A Study of Intensity Versus Phase Synchronous Modulation", IEEE 1996.*

Bigo et al., "All–optical Fiber Signal Processing and Regeneration for Soliton Communications", IEEE, Jul. 1997.*

* cited by examiner

Primary Examiner—Leslie Pascal
Assistant Examiner—Dalzid Singh
(74) Attorney, Agent, or Firm—Sughrue, Mion, Zinn, Macpeak & Seas, PLLC

(57) ABSTRACT

The invention relates to a regenerator using optical phase modulation in an optical fiber transmission system using soliton signals. According to the invention, the soliton signal is modulated by a clock in a modulator which is itself contained in an interferometer; the output signal from the interferometer has intensity that is representative of the phase difference between the clock and the soliton signal, and is therefore suitable for use in controlling the phase of the clock. In an embodiment, the interferometer is a Sagnac interferometer constituted by a non-linear optical loop mirror, and the modulation is distributed phase modulation in the transmission fiber. This enables the clock to be synchronized in simple manner.

19 Claims, 1 Drawing Sheet

REGENERATOR WITH OPTICAL MODULATION FOR OPTICAL FIBER TRANSMISSION SYSTEMS USING SOLITON SIGNALS

FIELD OF THE INVENTION

The present invention relates to a regenerator with distributed optical modulation for a transmission system conveying soliton pulses.

The invention also relates to a method of regenerating a soliton signal by distributed optical modulation.

Finally, the invention also relates to a transmission system including such a regenerator.

BACKGROUND OF THE INVENTION

The transmission of soliton pulses or "solitons" is a known phenomenon. These pulses are return-to-zero (RZ) pulses of time width (full width at half maximum or FWHM) that is small compared with the bit time, that present a determined relationship between power, spectrum width, and time width, and that generally propagate in that portion of an optical fiber which has abnormal dispersion. The way the envelope of such a soliton pulse varies in a monomode fiber can be modelled using the non-linear Schrödinger equation; propagation relies on equilibrium between fiber dispersion and fiber non-linearity.

The transmission of such pulses is limited by various effects such as jitter induced by solitons interacting with the noise present in the transmission system, as described for example in the article by J. P. Gordon and H. A. Haus, published in Optical Letters, Vol. 1, No. 10, pp. 665–667. This effect, known as the Gordon-Haus effect, puts a theoretical limit on the quality or on the rate of soliton transmission. To exceed this limit, it is possible to make use of synchronous modulation of soliton signals by means of a clock signal or "clock" for the purpose of correcting their time jitter, as explained for example in an article by H. Kubota, published in IEEE Journal of Quantum Electronics, Vol. 29, No. 7 (1994), p. 2189 et seq.

To provide such synchronous modulation, it has been proposed to use the Kerr effect in synchronous phase modulators. Thus, the fiber itself can be used for phase modulation purposes. A presentation by S. Bigo, P. Brindel, and O. Leclerc at the Oct. 30, 1996 symposium on guided optics ("Journées nationales de l'Optique guidées") held at Nice (France) describes soliton signal regeneration by all-optical phase modulation. An optical clock is superposed on the soliton signal, thereby imparting a non-linear phase shift to the soliton signal pulses by copropagating with them in an optical fiber that includes a length which has been selected to minimize the effects of slip between the soliton signal and the optical clock. Reference may be made to an article by T. Widdowson et al., entitled "Soliton shepherding: all-optical active soliton control over global distance", published in IEE Electron. Letters, Vol. 30, No. 12, p. 990 (1994).

It has also been shown by S. Bigo, in a thesis, University of Bensancon, 1996 entitled "Traitement de signal tout-optique pour la transmission à très haut débit de solitons par fibre optique" [All-optical signal processing for very high rate transmission of solitons by optical fiber] that an all-optical modulator using the Kerr effect, such as a non-linear optical loop mirror (NOLM) or a fiber, can be considered as a discrete sinusoidal modulator synchronized with the soliton train in spite of the slip or "walkoff" due to chromatic dispersion and to losses, providing the clock used is sinusoidal and the time offset between the signal to be modulated and the clock is appropriately adjusted.

One of the problems that arises with synchronous phase modulation is that of synchronizing phase between the clock and the soliton signal to be regenerated. In a conventional semiconductor modulator, such synchronization is conventionally achieved by deriving a signal whose intensity is representative of the phase difference between the modulating signal and the signals to be modulated. Feedback is then used to adjust the phase difference. Nevertheless, that solution is not applicable to distributed optical phase modulator devices using the Kerr effect in which there is no signal available of intensity that enables the phase of the modulator signal to be determined.

OBJECTS AND SUMMARY OF THE INVENTION

The present invention proposes an original and simple solution to the problem of synchronizing the clock in an optical phase modulator device, and in particular one using distributed optical phase modulation by the Kerr effect. The invention makes it possible by means of a simple device to obtain a signal whose intensity can be used to control synchronization, e.g. in a feedback loop. In the case of distributed optical phase modulation using the Kerr effect, this signal is representative of the non-linear phase profile induced by the modulator signal and integrated over the modulation length.

More precisely, the invention provides a regenerator for a soliton pulse transmission system, including a device for optically modulating the soliton signal that is to be regenerated with an optical clock signal, wherein the modulator device is included in an interferometer, and by means for synchronizing the soliton signal to be regenerated and the optical clock as a function of the intensity of the output signal from the interferometer.

The modulator device may be a phase modulator device, or a semiconductor modulator. The modulator device may also be a distributed optical modulator device, preferably distributed in the transmission fiber of the transmission system.

In an embodiment, the interferometer is a Sagnac interferometer, preferably a non-linear optical loop mirror. In which case, the interferometer advantageously includes polarization-maintaining fiber.

Preferably, the synchronization means adjust the phase of the clock signal in such a manner as to maximize the intensity of the output signal from the interferometer. Preferably, the clock signal is derived from the soliton signal to be regenerated.

The invention also provides an optical transmission system including at least one such regenerator.

Finally, the invention provides a method of regenerating a soliton signal, the method comprising:
optically modulating the soliton signal to be regenerated with an optical clock in a modulator contained within an interferometer; and
synchronizing the optical clock and the soliton signal to be regenerated as a function of the intensity of the output signal from the interferometer.

Advantageously, the modulation is phase modulation, preferably distributed optical phase modulation. In an implementation, the interferometer is a Sagnac interferometer, preferably a non-linear optical loop mirror.

In an implementation, neutrality relative to birefringence is ensured by means of a polarization-maintaining fiber.

Advantageously, synchronization is performed by adjusting the phase of the clock signal so as to maximize the intensity of the output signal from the interferometer. It is also possible to provide a step of deriving the clock signal from the soliton signal to be regenerated.

BRIEF DESCRIPTION OF THE DRAWING

Other characteristics and advantages of the invention appear on reading the following description of embodiments of the invention given by way of example and with reference to the accompanying drawing, in which.

MORE DETAILED DESCRIPTION

The invention proposes regenerating the incident soliton signal by optical phase modulation using a clock; the phase modulator is disposed in an interferometer whose output signal can be used to control synchronization of the clock and the soliton signal. In a preferred embodiment, the optical modulation is distributed optical modulation in a modulation fiber. The modulation fiber is included in a Sagnac interferometer and the intensity of the output signal from the interferometer is thus representative of the phase profile integrated over the full length of the modulation fiber.

Figure 1:
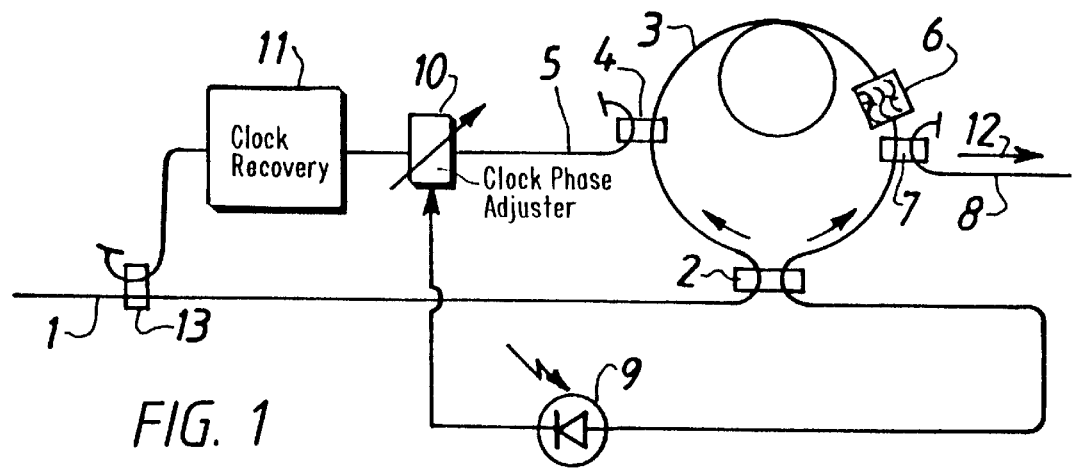
FIG. 1 is a theoretical diagram of a first embodiment of a regenerator of the invention.

FIG. 1 is a theoretical diagram of a regenerator of the invention, operating on this principle. In the FIG. 1 embodiment, the Sagnac interferometer is a non-linear optical loop mirror (NOLM). The FIG. 1 regenerator thus comprises a fiber 1 on which the soliton signal to be regenerated arrives; the fiber 1 is closed by a first 2/2 coupler with a coupling ratio $\eta_1/(1-\eta_1)$ so as to form a NOLM. The fiber 1 passes a first time through the first coupler 2, then a second time through the first coupler 2 in the opposite direction, thereby forming a NOLM with a length of fiber 3. On the fiber 3, downstream from the first coupler 2, there is a second coupler 4 which couples a clock into the fiber 3, which clock is received on a fiber 5. The coupler 4 may advantageously be constituted by a multiplexing coupler, thereby making it possible to minimize losses.

The modulating clock copropagates with the soliton signal to be regenerated over a modulation length of the fiber 1 where it modulates the soliton signal. On leaving said length of fiber, the regenerator has a filter 6 which filters out the clock signal, and a third coupler 7 which extracts the regenerated soliton signal from the fiber 1 and applies it to a fiber 8. The third coupler 7 has a coupling ratio $\eta_2/(1-\eta_2)$. The fiber 1 then passes again through the first coupler 2 so as to form a mirror. At the outlet from the mirror, the fiber 1 is then connected to a low frequency (LF) converter, e.g. an LF diode 9.

The output signal from the diode 9 is delivered to means 10 for adjusting the phase of the clock. In the embodiment of FIG. 1, the clock is obtained by extracting a portion of the incident soliton signal by means of a fourth coupler 13 placed on the fiber 1 upstream from the first coupler 2. The signal extracted is applied to clock recovery means 11; these derive a bit frequency signal from the soliton signal, which bit frequency signal is applied to the phase adjustment means 10.

The FIG. 1 device operates as follows. The soliton signal to be regenerated arrives via the fiber 1 and penetrates into the NOLM by passing a first time through the first coupler 2. It splits into two signals which propagate through the NOLM in opposite directions. The signal propagating from the first coupler 2 towards the second coupler 4, i.e. clockwise in the figure, is modulated by the clock signal injected into the NOLM by the second coupler 4. This signal is modulated between the second coupler 4 and the filter 6 because of the copropagation in the NOLM fiber of the signal to be regenerated and of the clock. The modulated signal is selected by the filter 6 which stops the clock signal and is then extracted from the NOLM by the third coupler 7 so as to propagate along the fiber 8 in the direction shown by arrow 12. The modulated signal also passes from the third coupler 7 towards the second coupler 2 and leaves the NOLM on the fiber 1.

The portion of the incident soliton signal extracted by the fourth coupler 13 is supplied to the clock recovery device 11 which extracts a clock therefrom. For this purpose, it is possible to use any clock recovery device known per se to the person skilled in the art, for example a device based on high Q-factor filtering or on a phase locked device which may be optical or opto-electronic.

The signal output from the NOLM on the fiber 1 after travelling through the first coupler 2 for a second time is of an intensity that is representative of the phase profile integrated over the modulation length. In other words, this signal which is the regenerated soliton signal has a mean power that increases with increasing closeness of phase between the signal to be regenerated and the clock. The LF converter 9 therefore provides an electronic output signal whose intensity is representative of the effectiveness of the modulation. This signal can be used to control the phase adjustment means 10. These means may comprise devices known per se to the person skilled in the art, such as the corner of a cube placed at a variable distance from a fiber, or two facing fibers that are movable relative to each other, or indeed a coil of fiber wound around a piezoelectric core.

Figure 2:
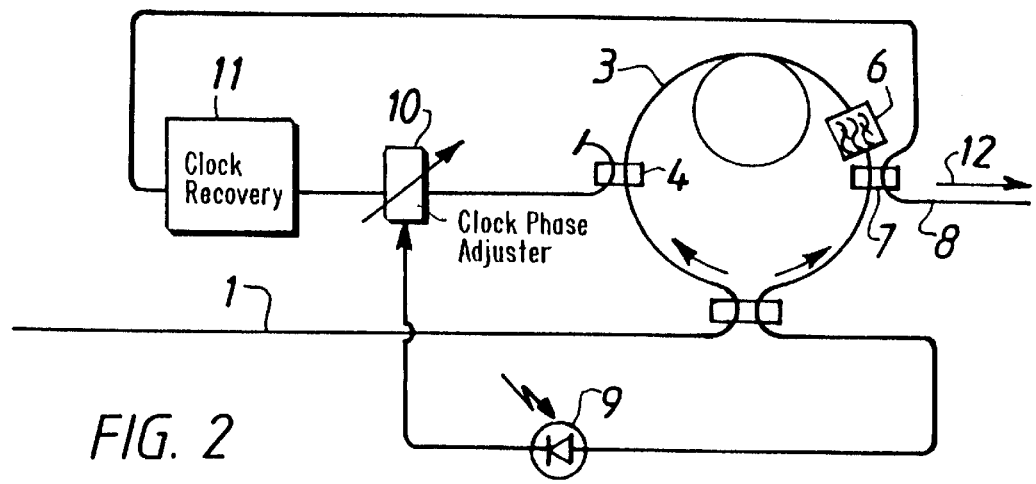
FIG. 2 is a theoretical diagram of a second. embodiment of a regenerator of the invention.

FIG. 2 shows a second embodiment of the invention. The embodiment of FIG. 2 is analogous to that of FIG. 1, however the clock recovery device does not receive a portion of the incident soliton signal, but a signal coming from the third coupler 7. In the embodiment of FIG. 2, the outlet of the third coupler 7 takes off a portion of the soliton signal propagating from the first coupler 2 towards the third coupler 7, i.e. counter-clockwise in the figure. This signal portion is conveyed to the clock recovery device on the fiber 8, in the opposite direction to arrow 12.

Figure 3:
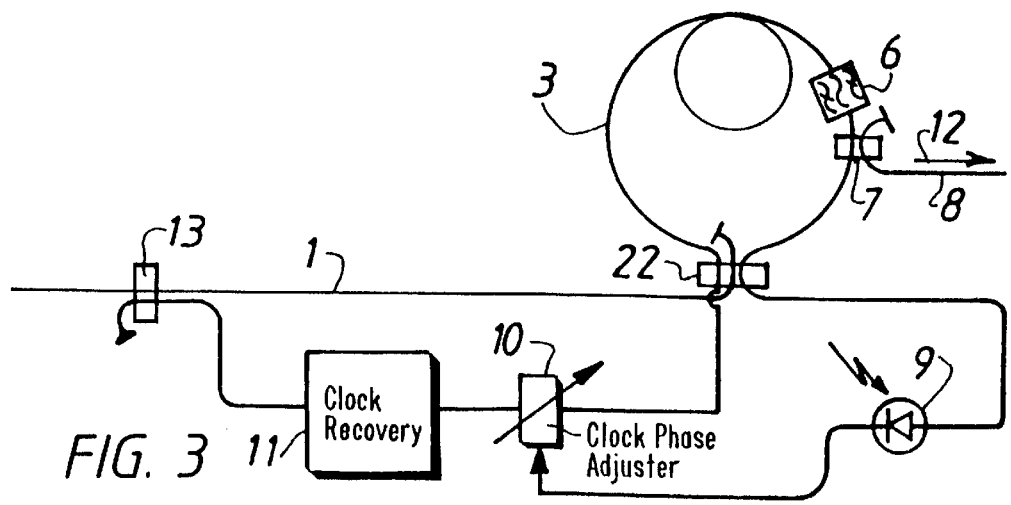
FIG. 3 is a theoretical diagram of a third embodiment of a regenerator of the invention.

FIG. 3 shows another embodiment of the invention in which the interferometer is constituted by another variant NOLM. The FIG. 3 device is analogous to that of FIG. 1, however in FIG. 3, the first inlet coupler to the NOLM is a 3/3 coupler 22. The fiber 1 enters the coupler via its second inlet and leaves via the third outlet. The clock signal is coupled into the NOLM via the first inlet of the 3/3 coupler. This avoids the need to provide the second coupler 4 of FIG. 1. The ends of the mirror loop are connected to the first and third outlets.

In this case, the clock recovery device 11 also provides a clock at bit frequency. The use of such a configuration also makes it possible to avoid the frequency doubling phenomenon induced by the NOLM, as described for example in S. Bigo et al., Electronics Letters, Vol. 31, No. 25, p. 2191 (1995). This phenomenon can give rise to uncertainty of π concerning the relative time position of the clock and of the signal.

Operation of the FIG. 3 device is analogous to that of the FIG. 1 device.

In the embodiments of FIGS. 1 to 3, the modulator fiber is contained entirely within the Sagnac interferometer. The devices of FIGS. 1 to 3 make use of the properties of a NOLM to obtain a signal that enables the phase of the clock to be controlled. These devices do not make use of the properties of a NOLM for modulation purposes insofar as the modulation devices are to be found entirely within the interferometer.

In the various embodiments described, it is preferable to control birefringence in the NOLM. If a conventional transmission fiber is used, it is possible to provide polarization controllers or birefringent plates in the mirror. It is also possible to achieve the equivalent of neutrality concerning birefringence by using a polarization-maintaining fiber in the NOLM; for this purpose, reference may be made to the article by Uchiyama et al. in Electronics Letters, Vol. 28, No. 20, p. 1864 (1992).

Naturally, the present invention is not limited to the embodiments described and shown, but can be varied in numerous ways by the person skilled in the art. Thus, it is possible with the FIG. 3 device for the soliton signal extracted by the coupler 7 to be used for recovering the clock, as is done in FIG. 2, with a filter being provided, where appropriate. In the FIG. 3 device, it is also possible to use the signal present on the central outlet of the 3/3 coupler for clock recovery purposes, again with a filter. Also, in the configuration of FIG. 1 or of FIG. 2, it is possible to use a 3/3 inlet coupler for the NOLM, so as to avoid frequency doubling.

It is also clear that the invention is not limited to the preferred implementation of optical modulation that is distributed in the modulation fiber. Other phase modulation devices could be used, such as a semiconductor modulator, for example. Nor is the invention limited to a Sagnac interferometer whose non-linear optical loop mirror merely constitutes the most stable example for long lengths of modulation fiber. Thus, it is possible to use a Mach Zender interferometer, for example when the modulator is a semiconductor modulator. Under such circumstances, the invention provides an alternative to using the total current of the modulator to control modulation.

What is claimed is:

1. A regenerator for a soliton pulse transmission system, including a modulator device for optically modulating the soliton signal that is to be regenerated with an optical clock signal, wherein the modulator device is included in an interferometer, and means for synchronizing the soliton signal to be regenerated and the optical clock as a function of the intensity of the output signal from the interferometer.

2. A regenerator according to claim 1, wherein the modulator device is a phase modulator device.

3. A regenerator according to claim 2, wherein the modulator device is a semiconductor modulator.

4. A regenerator according to claim 2, wherein the modulator device is a distributed optical modulator device.

5. A regenerator according to claim 4, wherein the distributed optical modulator device is distributed in the transmission fiber of the transmission system.

6. A regenerator according to claim 1, wherein the interferometer is a Sagnac interferometer.

7. A regenerator according to claim 6, wherein the interferometer includes polarization-maintaining fiber.

8. A regenerator according to claim 6, wherein the interferometer is a non-linear optical loop mirror.

9. A regenerator according to claim 1, wherein the synchronization means adjust the phase of the clock signal in such a manner as to maximize the intensity of the output signal from the interferometer.

10. A regenerator according to claim 1, wherein the clock signal is derived from the soliton signal to be regenerated.

11. An optical transmission system comprising at least one regenerator according to claim 1.

12. A method of regenerating a soliton signal, the method comprising:

optically modulating the soliton signal to be regenerated with an optical clock in a modulator contained within an interferometer; and synchronizing the optical clock and the soliton signal to be regenerated as a function of the intensity of the output signal from the interferometer.

13. A method according to claim 12, wherein the modulation is phase modulation.

14. A method according to claim 13, wherein the modulation is distributed optical phase modulation.

15. A method according to claim 12, wherein the interferometer is a Sagnac interferometer.

16. A method according to claim 15, wherein neutrality relative to birefringence is ensured by means of a polarization-maintaining fiber.

17. A method according to claim 15, wherein the interferometer is a non-linear optical loop mirror.

18. A method according to claim 12, wherein synchronization is performed by adjusting the phase of the clock signal so as to maximize the intensity of the output signal from the interferometer.

19. A method according to claim 12, including a step of deriving the clock signal from the soliton signal to be regenerated.

* * * * *